US011584645B2

(12) United States Patent
Isojima

(10) Patent No.: US 11,584,645 B2
(45) **Date of Patent: *Feb. 21, 2023**

(54) CORE SHELL PARTICLE, METHOD OF PRODUCING CORE SHELL PARTICLE, AND FILM

(71) Applicant: FUJIFILM Corporation, Tokyo (JP)

(72) Inventor: Hiroshi Isojima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 558 days.

This patent is subject to a terminal disclaimer.

(21) Appl. No.: 16/544,918

(22) Filed: Aug. 20, 2019

(65) Prior Publication Data

US 2019/0375637 A1 Dec. 12, 2019

Related U.S. Application Data

(63) Continuation of application No. PCT/JP2018/001125, filed on Jan. 17, 2018.

(30) Foreign Application Priority Data

Feb. 21, 2017 (JP) ............................ JP2017-029864
Aug. 23, 2017 (JP) ............................ JP2017-159940

(51) Int. Cl.
*C01B 25/08* (2006.01)
*C09K 11/62* (2006.01)
*B82Y 30/00* (2011.01)

(52) U.S. Cl.
CPC .............. *C01B 25/08* (2013.01); *C09K 11/62* (2013.01); *B82Y 30/00* (2013.01)

(58) Field of Classification Search
None
See application file for complete search history.

(56) References Cited

U.S. PATENT DOCUMENTS

2017/0247613 A1* 8/2017 Ono ..................... C09K 11/565

FOREIGN PATENT DOCUMENTS

| | | |
|---|---|---|
| CN | 103074068 | 5/2013 |
| EP | 2599898 | 6/2013 |
| KR | 20180040911 | 4/2018 |
| WO | 2016080435 | 5/2016 |

OTHER PUBLICATIONS

Office Action of Japan Counterpart Application, with English translation thereof, dated May 26, 2020, pp. 1-10.
"International Search Report (Form PCT/ISA/210) of PCT/JP2018/001125," dated Apr. 3, 2018, with English translation thereof, pp. 1-4.
"International Preliminary Report on Patentability (Form PCT/IPEA/409) of PCT/JP2018/001125," completed on May 20, 2019, with English translation thereof, pp. 1-12.
F.S. Manciu et al., "Infrared and Raman spectroscopies of InP/II-VI core-shell nanoparticles" , Physica E, vol. 26, Feb. 2005, pp. 14-18.
Mickael D. Tessier et al., "Economic and Size-Tunable Synthesis of InP/ZnE (E=S, Se) Colloidal Quantum Dots." , Chem. Mater., vol. 27, Jun. 2015, pp. 4893-4898.

* cited by examiner

*Primary Examiner* — Ronak C Patel
(74) *Attorney, Agent, or Firm* — JCIPRNET

(57) ABSTRACT

Provided are a core shell particle including a core which contains a Group III element and a Group V element, and a shell which covers at least a part of a surface of the core and contains a Group II element and a Group VI element, in which a ratio of a peak intensity showing a bond between the Group III element and the Group II element to a peak intensity showing a bond between the Group III element and the Group V element, which is measured by Raman spectroscopy, is in a range of 0.16 to 0.33; a method of producing the core shell particle; and a film formed of the core shell particle.

11 Claims, No Drawings

CORE SHELL PARTICLE, METHOD OF PRODUCING CORE SHELL PARTICLE, AND FILM

CROSS-REFERENCE TO RELATED APPLICATIONS

This application is a Continuation of PCT International Application No. PCT/JP2018/001125 filed on Jan. 17, 2018, which claims priority under 35 U.S.C. § 119(a) to Japanese Patent Application No. 2017-029864 filed on Feb. 21, 2017 and Japanese Patent Application No. 2017-159940 filed on Aug. 23, 2017. Each of the above applications is hereby expressly incorporated by reference, in its entirety, into the present application.

BACKGROUND OF THE INVENTION

1. Field of the Invention

The present invention relates to a core shell particle, a method of producing the same, and a film containing a core shell particle.

2. Description of the Related Art

As semiconductor fine particles which are expected to be applied to colloidal semiconductor nanoparticles (so-called quantum dots), Group II-VI semiconductor fine particles or Group III-V semiconductor fine particles have been known.

The particle diameter of these semiconductor fine particles is several nanometers to several tens of nanometers.

Further, a band gap typically becomes larger as the particle diameter of particles having such a nanoscale decreases due to so-called quantum size effects, and the particles exhibit light emission in a short wavelength range such as an ultraviolet region or a near ultraviolet region.

Therefore, in order to use optical characteristics specific to the semiconductor fine particles, applications to various devices such as a piezoelectric element, an electronic device, a light-emitting element, and a laser have been researched and developed.

For example, WO2016/080435A describes, as a core shell particle which has high luminous efficacy and is useful as a quantum dot, a core shell particle including: a core which contains a Group III element and a Group V element; and a shell which covers at least a part of a surface of the core and contains a Group II element and a Group VI element, in which a ratio of a peak intensity of the Group II element to a peak intensity of the Group III element, which is measured by X-ray photoelectron spectroscopy, is 0.25 or greater (claim 1).

SUMMARY OF THE INVENTION

The present inventors conducted examination on the particle described in WO2016/080435A, and thus it was found that the luminous efficacy deteriorates in some cases depending on the synthesis process (for example, the raw material and the reaction temperature).

Accordingly, an object of the present invention is to provide a core shell particle having high luminous efficacy and is useful as a quantum dot, a method of producing the core shell particle, and a film formed of the core shell particle.

As the result of intensive examination conducted by the present inventors in order to achieve the above-described object, it was found that the luminous efficacy is improved by providing a core shell particle including a core formed of a Group III-V and a shell formed of a Group II-VI semiconductor, in which a ratio of a peak intensity showing a bond between the Group III element and the Group II element to a peak intensity showing a bond between the Group III element and the Group V element, which is measured by Raman spectroscopy, is set to be in a predetermined range, thereby completing the present invention.

In other words, it was found that the above-described object can be achieved by employing the following configurations.

[1] A core shell particle comprising: a core which contains a Group III element and a Group V element; and a shell which covers at least a part of a surface of the core and contains a Group II element and a Group VI element, in which a ratio of a peak intensity showing a bond between the Group III element and the Group II element to a peak intensity showing a bond between the Group III element and the Group V element, which is measured by Raman spectroscopy, is in a range of 0.16 to 0.33.

[2] The core shell particle according to [1], in which the Group III element is In, and the Group V element is any of P, N, or As.

[3] The core shell particle according to [2], in which the Group III element is In, and the Group V element is P.

[4] The core shell particle according to any one of [1] to [3], in which the Group II element is Zn, and the Group VI element is S or Se.

[5] The core shell particle according to [4], in which the Group II element is Zn, and the Group VI element is S.

[6] The core shell particle according to any one of [1] to [5], in which the Group III element is In, the Group V element is P, the Group II element is Zn, the Group VI element is S, and a peak showing a bond between the Group III element and the Group V element is present in a range of 340 to 365 $cm^{-1}$, and a peak showing a bond between the Group III element and the Group II element, which is measured by Raman spectroscopy, is present in a range of 200 to 230 $cm^{-1}$.

[7] A method of producing a core shell particle, comprising: a first step of mixing a Group III raw material containing a Group III element with a Group II raw material containing a Group II element such that a molar ratio of the Group II raw material to the Group III raw material is 1.5 or greater to prepare a mixed solution containing the raw materials dissolved therein; a second step of adding a Group V raw material containing a Group V element to the mixed solution to form a core containing the Group III element and the Group V element; and a third step of adding a Group VI raw material containing a Group VI element to the mixed solution after the formation of the core to form a shell containing the Group II element and the Group VI element in at least a part of a surface of the core, in which the third step is performed at a temperature of 255° C. to 295° C.

[8] The method of producing a core shell particle according to [7], in which the Group III element is In, and the Group V element is any of P, N, or As.

[9] The method of producing a core shell particle according to [8], in which the Group III element is In, and the Group V element is P.

[10] The method of producing a core shell particle according to any one of [7] to [9], in which the Group II element is Zn, and the Group VI element is S or Se.

[11] The method of producing a core shell particle according to [10], in which the Group II element is Zn, and the Group VI element is S.

[12] The method of producing a core shell particle according to any one of [7] to [11], in which the Group III raw material is a chloride of In.

[13] The method of producing a core shell particle according to any one of [7] to [12], in which the Group II raw material is a chloride of Zn.

[14] The method of producing a core shell particle according to any one of [7] to [13], in which the Group V raw material is trisdialkylaminophosphine.

[15] The method of producing a core shell particle according to any one of [7] to [14], in which the Group VI raw material is alkylthiol.

[16] A film comprising: the core shell particle according to any one of [1] to [6].

According to the present invention, it is possible to provide a core shell particle having high luminous efficacy and is useful as a quantum dot, a method of producing the core shell particle, and a film formed of the core shell particle.

DESCRIPTION OF THE PREFERRED EMBODIMENTS

Hereinafter, the present invention will be described in detail.

The description of constituent elements below will be occasionally made based on representative embodiments of the present invention, but the present invention is not limited to these embodiments.

In the present specification, the numerical ranges expressed using "to" indicate the ranges including the numerical values described before and after "to" as the lower limits and the upper limits.

[Core Shell Particle]

A core shell particle according to the embodiment of the present invention is a core shell particle including a core which contains a Group III element and a Group V element, and a shell which covers at least a part of a surface of the core and contains a Group II element and a Group VI element.

Further, in the core shell particle according to the embodiment of the present invention, the ratio [hereinafter, also referred to as a "Raman peak intensity ratio"] of a peak intensity showing a bond between the Group III element and the Group II element to a peak intensity showing a bond between the Group III element and the Group V element, which is measured by Raman spectroscopy, is in a range of 0.16 to 0.33.

In the present invention, the Raman peak intensity ratio is measured according to the following method.

As a light source, a titanium sapphire laser (Libra, manufactured by Coherent Japan, Inc., wavelength of 800 nm, pulse time width of 92 fs, output of 4.10 W, and repetition frequency of 1 kHz) is used.

The fundamental wave (800 nm) is divided into two waves so as to be used to generate Raman excitation light and white light for Raman detection.

The Raman excitation light (530 nm, 3.5 ps, 8 $cm^{-1}$) is generated using a picosecond optical parametric amplifier, and the Raman detection light is generated by focusing the fundamental wave on a sapphire plate.

In a case of the Raman detection light, the wavelength range thereof is selected to be in a range of 532 to 680 nm, dispersion compensation is carried out using a chirp mirror, and the pulse time width thereof is set to 10 fs.

A sample is irradiated with the Raman excitation light and the Raman detection light using a parabolic minor.

A sample solution is filled with a quartz cell (optical path length of 1 mm).

The Raman detection light transmitted through the sample is wavelength-dispersed by a spectroscope and detected by a charge-coupled device (CCD).

After spectral information of a Raman signal is obtained in the above-described manner, the peak height of a peak showing a longitudinal optical (LO) mode of a bond between a Group III element and a Group V element is measured. Further, at the time of normalization of the peak height to 1, the peak height of a peak showing a bond between a Group III element and a Group II element is referred to as a "Raman peak intensity ratio".

For example, a peak derived from a bond between In and P is present at around 350 $cm^{-1}$ (340 to 365 $cm^{-1}$), and a peak derived from a bond between In and Zn is at around 210 $cm^{-1}$ (200 to 220 $cm^{-1}$).

Further, for example, a peak derived from a bond between Ga and P is present at around 405 $cm^{-1}$ (395 to 415 $cm^{-1}$), and a peak derived from a bond between Ga and N is at around 740 $cm^{-1}$ (730 to 750 $cm^{-1}$).

Further, for example, a peak derived from a bond between Ga and Zn is present at around 420 $cm^{-1}$ (410 to 430 $cm^{-1}$), and a peak derived from a bond between Ga and Mg is at around 420 $cm^{-1}$ (410 to 430 $cm^{-1}$).

Further, the peak intensity showing a bond between a Group III element and a Group II element to be measured can also be detected in, for example, In—P—Zn and In—Zn—P in the bond vibration between a Group III element (such as In) and a Group II element (such as Zn) through a Group V element (such as P).

The luminous efficacy of the core shell particle according to the embodiment of the present invention is improved by setting the Raman peak intensity ratio to be in a range of 0.16 to 0.33.

The reason why the luminous efficacy is improved as described above is not clear, but is assumed as follows.

The luminous efficacy is considered to be improved because alloying of a Group III element (such as In) and a Group V element (such as P) contained in the core and a Group II element (such as Zn) contained in the shell appropriately proceeds, and the thickness of the Group III element-Group II element-Group V element alloy layer between the core and the shell is set to be in a range suitable for alleviating the lattice mismatch between the core and the shell in a case where the Raman peak intensity ratio is in a range of 0.16 to 0.33. This can be speculated from the results of the examples and the comparative examples described below.

In the present invention, from the viewpoint of further improving the luminous efficacy, the Raman peak intensity ratio is preferably in a range of 0.18 to 0.33, more preferably in a range of 0.20 to 0.30, and still more preferably in a range of 0.25 to 0.30.

[Core]

The core contained in the core shell particle according to the embodiment of the present invention is a so-called Group III-V semiconductor that contains a Group III element and a Group V element.

<Group III Element>

Specific examples of the Group III element include indium (In), aluminum (Al), and gallium (Ga). Among these, In is preferable.

<Group V Element>

Specific examples of the Group V element include phosphorus (P), nitrogen (N), and arsenic (As). Among these, P is preferable.

In the present invention, a Group III-V semiconductor obtained by appropriately combining the Group III element and the Group V element exemplified above can be used as the core, but InP, InN, or InAs is preferable, and InP is more preferable from the viewpoints of further increasing the luminous efficacy and easily obtaining an excellent half-width of light emission.

[Shell]

The shell contained in the core shell particle according to the embodiment of the present invention is a material that covers at least a part of the surface of the core and is a so-called Group II-VI semiconductor that contains a Group II element and a Group VI element.

Here, in the present invention, it is possible to confirm whether at least a part of the surface of the core is covered with the shell based on composition distribution analysis according to energy dispersive X-ray spectroscopy (TEM-EDX) using a transmission electron microscope, but it is necessarily satisfied in a case where the above-described Raman peak intensity ratio is in a range of 0.16 to 0.33 as apparent from the comparison of the examples and the comparison examples described below.

<Group II Element>

Specific examples of the Group II element include zinc (Zn), cadmium (Cd), and magnesium (Mg). Among these, Zn is preferable.

<Group VI Element>

Further, specific examples of the Group VI element include sulfur (S), oxygen (O), selenium (Se), and tellurium (Te). Among these, S or Se is preferable and S is more preferable.

In the present invention, a Group II-VI semiconductor obtained by appropriately combining the Group II element and the Group VI element described above can be used as the shell, but it is preferable that the shell has a crystal system which is the same as or similar to the core described above.

Specifically, ZnS or ZnSe is preferable, and ZnS is more preferable from the viewpoint of the safety and the like.

[Coordination Molecule]

From the viewpoints of imparting dispersibility and reducing the surface defects, it is desirable that the surface of the core shell particle according to the embodiment of the present invention has coordination molecules.

From the viewpoint of the dispersibility or the like in a non-polar solvent, it is preferable that the coordination molecule contains aliphatic hydrocarbon.

Further, from the viewpoint of improving the dispersibility, it is preferable that the coordination molecule is a ligand having at least 6 carbon atoms in the main chain and more preferable that the coordination molecule is a ligand having 10 or more carbon atoms in the main chain.

Such a coordination molecule may be a saturated compound or an unsaturated compound, and specific examples thereof include decanoic acid, lauric acid, myristic acid, palmitic acid, stearic acid, behenic acid, oleic acid, erucic acid, oleylamine, dodecylamine, dodecanethiol, 1,2-hexadecanethiol, trioctylphosphine oxide, and cetrimonium bromide. These may be used alone or in combination of two or more kinds thereof.

Among these, from the viewpoint that generation of a Group III-V semiconductor is not inhibited, formation of an oxide is suppressed, and excellent semiconductor crystals are obtained even in a case where a Group V raw material with a low reactivity (such as trisdialkylaminophosphine) is used, it is desirable to use an amine-based compound such as oleylamine or dodecylamine which does not have an oxygen atom.

[Average Particle Diameter]

From the viewpoints of easily synthesizing particles having a uniform size and easily controlling the emission wavelength using quantum size effects, the average particle diameter of the core shell particles according to the embodiment of the present invention is preferably 2 nm or greater and more preferably 10 nm or less.

Here, the average particle diameter is a value obtained by directly observing at least 20 particles using a transmission electron microscope, calculating the diameters of circles having the same area as the projected area of the particles, and arithmetically averaging these values.

[Method of Producing Core Shell Particles]

A method of producing a core shell particle for synthesizing the core shell particle according to the embodiment of the present invention described above (hereinafter, also referred to as the "production method according to the embodiment of the present invention") is a method of producing a core shell particle, including a first step of mixing a Group III raw material containing a Group III element with a Group II raw material containing a Group II element such that the molar ratio of the Group II raw material to the Group III raw material is 1.5 or greater to prepare a mixed solution containing the raw materials dissolved therein; a second step of adding a Group V raw material containing a Group V element to the mixed solution to form a core containing the Group III element and the Group V element; and a third step of adding a Group VI raw material containing a Group VI element to the mixed solution after the formation of the core to form a shell containing the Group II element and the Group VI element in at least a part of a surface of the core, in which the third step is performed at a temperature of 255° C. to 295° C.

Here, examples of the Group II element, the Group III element, the Group V element, and the Group VI element are the same as those described in the section of the core shell particle according to the embodiment of the present invention described above.

Hereinafter, raw materials and conditions of each treatment step will be described in detail.

[First Step]

The first step is a step of mixing a Group III raw material containing a Group III element with a Group II raw material containing a Group II element such that the molar ratio of the Group II raw material to the Group III raw material is 1.5 or greater to prepare a mixed solution containing the raw materials dissolved therein.

In the production method according to the embodiment of the present invention, from the viewpoint of forming the coordination molecules in the surface of the core shell particle to be obtained, an aspect in which the Group III raw material and the Group II raw material are added to the solution containing the coordination molecules so as to be dissolved therein in the first step is preferable.

<Group III Raw Material>

Specific examples of the Group III raw material containing a Group III element include indium chloride, indium oxide, indium nitrate, indium sulfate, and indium acid; aluminum phosphate, aluminum acetylacetonate, aluminum chloride, aluminum fluoride, aluminum oxide, aluminum nitrate, aluminum sulfate, gallium acetylacetonate, and gallium chloride; and gallium fluoride, gallium oxide, gallium nitrate, and gallium sulfate.

Among these, from the viewpoint that excellent semiconductor crystals (cores) are obtained even in a case where a Group V raw material with a low reactivity (such as trisdialkylaminophosphine) is used and oxidation is unlikely to occur, it is preferable to use indium chloride which is a chloride of In.

<Group II Raw Material>

Specific examples of the Group II raw material including a Group II element include dimethyl zinc, diethyl zinc, zinc carboxylate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc acetate, and zinc sulfate.

Among these, from the viewpoints that oxidation is unlikely to occur and the compatibility with optical coordination molecules described below and the solubility in a non-polar solvent are relatively high, it is preferable to use zinc chloride which is a chloride of Zn.

<Molar Ratio of Group II Raw Material to Group III Raw Material>

A value [y/x] which is a ratio of a molar number y of the Group II raw material to a molar number x of the Group III raw material at the time of mixing the Group III raw material with the Group II raw material described above in the first step is referred to as a "molar ratio of the Group II raw material to the Group III raw material". Further, the molar ratio of the Group II raw material to the Group III raw material is referred to as a "Group II/Group III ratio" in some cases.

In the production method according to the embodiment of the present invention, the Group II/Group III ratio is 1.5 or greater, preferably in a range of 1.5 to 5.0, more preferably in a range of 1.5 to 3.0, still more preferably 1.5 or greater and less than 3.0, even still more preferably 2.0 or greater and less than 3.0, and even still more preferably greater than 2.0 and less than 3.0.

[Coordination Molecules]

In a case where the above-described coordination molecules are used together with the Group III raw material and the Group II raw material described above in the first step, it is desirable to use an amine-based compound such as oleylamine or dodecylamine which does not have an oxygen atom as described above.

<Non-Polar Solvent>

In the production method according to the embodiment of the present invention, it is preferable to use a non-polar solvent together with the Group III raw material, the Group II raw material, and optional coordination molecules in the first step.

Specific examples of the non-polar solvent include aliphatic saturated hydrocarbon such as n-decane, n-dodecane, n-hexanedecane, or n-octadecane; aliphatic unsaturated hydrocarbon such as 1-undecene, 1-dodecene, 1-hexadecene, or 1-octadecene; and trioctylphosphine.

Among these, aliphatic unsaturated hydrocarbon having 12 or greater carbon atoms is preferable and 1-octadecene is more preferable.

<Dissolution Conditions>

In the first step, the method is not particularly limited to the method of dissolving the Group III raw material, the Group II raw material, optional coordination molecules, and the like, a method of heating the solution at a temperature of 100° C. to 180° C. so that the raw materials and the coordination molecules are dissolved therein is preferable. At this time, it is preferable that dissolved oxygen or moisture is removed from the mixed solution by heating the solution under reduced pressure.

Further, the time required for heating and dissolving is preferably 30 minutes or longer.

[Second Step]

The second step is a step of adding a Group V raw material containing a Group V element to the mixed solution in which the Group III raw material and the Group II raw material are dissolved to form a core containing the Group III element and the Group V element.

Here, in the production method according to the embodiment of the present invention, since the Group II raw material is added in the first step described above, the Group II raw material serving as a raw material of the shell is present at the time of formation of a core in the second step. However, the Group II raw material is unlikely to be used to form the core, and thus most of the Group II raw material is considered to be present in the surface of the core.

As described above, since the Group II raw material serving as a material of the shell is present at the time of formation of the core, the luminous efficacy of the core shell particle to be obtained is further improved. The reason for this is considered that since the Group VI raw material is added in the third step so that the Group II raw material and the Group VI raw material, which are present in the surface of the core, react with each other in advance at the time of formation of the shell, a uniform coating is formed and the interface between the core and the shell is slightly delocalized (in a solid solution state).

<Group V Raw Material>

Specific examples of the Group V raw material containing a Group V element include tristrialkylsilyl phosphine, trisdialkylsilyl phosphine, and trisdialkylaminophosphine; arsenic oxide, arsenic chloride, arsenic sulfate, arsenic bromide, and arsenic iodide; and nitric monooxide, nitric acid, and ammonium nitrate.

Among these, it is preferable to use tristrialkylsilyl phosphine or trisdialkylaminophosphine and more preferable to use trisdialkylaminophosphine from the viewpoints of the safety and the cost. Specifically, it is still more preferable to use trisdimethylaminophosphine.

<Heating Conditions>

From the viewpoint of dissolving the above-described Group V raw material to increase the reactivity between the Group III raw material and the Group V raw material, it is preferable that the second step is performed under heating conditions.

In the second step, the temperature (hereinafter, also referred to as the "temperature at the time of adding the Group V raw material") at the time of adding the Group V raw material to the mixed solution prepared in the first step is not particularly limited and can be appropriately set depending on the kind of the Group V raw material and the mixed solution prepared in the first step, but is preferably lower than 230° C., more preferably in a range of 100° C. to 220° C., still more preferably in a range of 120° C. to 200° C., and even still more preferably in a range of 150° C. to 180° C. from the viewpoints of suppressing the influence of Ostwald ripening and making the particle diameters of cores uniform.

For example, in a case where trisdimethylaminophosphine is used, the temperature thereof is more preferably in a range of 120° C. to 200° C. and still more preferably in a range of 150° C. to 180° C. In a case where the solution is heated at a temperature of 120° C. to 200° C., the non-uniformity of the core to be formed is decreased so that the half-width of light emission is easily controlled to be small.

Further, in the second step, the temperature (hereinafter, also referred to as the "temperature of forming the core")

after the Group V raw material is added to the mixed solution prepared in the first step is not particularly limited and can be appropriately set depending on the kind of the Group V raw material and the mixed solution prepared in the first step, but is preferably 250° C. or lower, more preferably in a range of 200° C. to 240° C., still more preferably in a range of 210° C. to 240° C., and even still more preferably in a range of 220° C. to 240° C.

Further, the heating time (hereinafter, also referred to as the "time for forming the core") is not particularly limited and can be appropriately set depending on the particle size of the core. It is preferable that the time for forming the core is set to be in a range of 0.5 minutes to 120 minutes in consideration of the size of a typical core used as a quantum dot.

[Third Step]

The third step is a step of adding a Group VI raw material containing a Group VI element to the mixed solution after the formation of the core to form a shell containing the Group II element and the Group VI element in at least a part of a surface of the core and is performed at a temperature of 255° C. to 295° C.

<Group VI Raw Material>

Specific examples of the Group VI raw material containing a Group VI element include sulfur, alkylthiol, trialkylphosphine sulphide, trialkenylphosphine sulphide, alkylamino sulphide, alkenylamino sulphide, cyclohexyl isothiocyanate, diethyl dithiocarbamic acid, and diethyl dithiocarbamic acid; and trialkylphosphine selenium, trialkenylphosphine selenium, alkylamino selenium, alkenylamino selenium, trialkylphosphine telluride, trialkenylphosphine telluride, alkylamino telluride, and alkenylamino telluride.

Among these, from the viewpoint of excellent dispersibility of core shell particles to be obtained, it is preferable to use alkylthiol, specifically, more preferable to use dodecanethiol and/or octanethiol, and still more preferable to use dodecanethiol.

<Heating Conditions>

As described above, the heating temperature (hereinafter, also referred to as the "temperature of forming the shell") in the third step is in a range of 255° C. to 295° C., preferably in a range of 260° C. to 290° C., and more preferably in a range of 270° C. to 290° C.

In the production method according to the embodiment of the present invention, in a case where the temperature of forming the shell is set to be in a range of 255° C. to 295° C., alloying of a Group III element (such as In) and a Group V element (such as P) contained in the core and a Group II element (such as Zn) contained in the shell appropriately proceeds so that the above-described Raman peak intensity ratio is set to be in a range of 0.16 to 0.33.

Further, the heating time (hereinafter, also referred to as the "time for forming the shell") is not particularly limited and can be appropriately set. From the viewpoint of further improving the luminous efficacy, the time for forming the shell is preferably set to 1 hour or longer and more preferably set to 7 hours or longer under a condition in which the temperature of forming the shell is in a range of 255° C. to 295° C.

In the third step of the production method according to the embodiment of the present invention, from the viewpoint of further improving the luminous efficacy, not only the Group VI raw material but also the Group II raw material may be further added.

[Film]

The film according to the embodiment of the present invention is a film containing the core shell particle according to the embodiment of the present invention described above.

Since such a film according to the embodiment of the present invention has high luminous efficacy and is useful as quantum dots, the film can be applied to a wavelength conversion film used for a display, a photoelectron conversion (or wavelength conversion) film of a solar cell, a biological label, a thin film transistor, and the like.

Further, the film material as a base material constituting the film according to the embodiment of the present invention is not particularly limited and may be a resin or a thin glass film.

Specific examples thereof include resin materials mainly formed of an ionomer, polyethylene, polyvinyl chloride, polyvinylidene chloride, polyvinyl alcohol, polypropylene, polyester, polycarbonate, polystyrene, polyacrylonitrile, an ethylene vinyl acetate copolymer, an ethylene-vinyl alcohol copolymer, an ethylene-methacrylic acid copolymer film, and nylon.

EXAMPLES

Hereinafter, the present invention will be described in more detail based on examples. The materials, the use amounts, the ratios, the treatment contents, and the treatment procedures described in the following examples can be changed as appropriate within the range not departing from the gist of the present invention. Therefore, the scope of the present invention should not be limitatively interpreted by the following examples.

Examples 1 to 6 and Comparative Examples 2 to 5

<First Step>

29.50 mL of oleylamine serving as coordination molecules, 1.20 g (5.4 mmol) of indium chloride serving as a Group III raw material, and zinc chloride serving as a Group II raw material were added to a flask such that the amounts of Zn and In were set to the values of the "mixing ratio of Zn/In" listed in Table 1, and the solution was heated and stirred at 100° under reduced pressure to dissolve the raw materials and degassed for 50 minutes.

<Second Step>

Next, the flask was heated to the temperature shown in the "temperature (° C.) at the time of adding the Group V raw material" in Table 1 in a nitrogen flow, and the state was maintained for 50 minutes.

After the temperature of the solution was stabilized, 1.5 mL (8.27 mmol) of trisdimethylaminophosphine serving as a Group V raw material was added thereto, and the solution was heated for 25 minutes in a state in which the temperature shown in the "temperature (° C.) for forming the core" in Table 1 was maintained.

After the solution was heated, it was able to be confirmed that the solution was colored red and particles (cores) were formed.

<Third Step>

Next, 17.96 mL of dodecanethiol serving as a Group VI raw material was added to the solution containing cores in a state of being heated to the temperature shown in the "temperature (° C.) of forming the shell" in Table 1, and the solution was heated for 7 hours in a state in which the temperature shown in the "temperature (° C.) of forming the shell" in Table 1 was maintained.

Next, the obtained solution was cooled to room temperature, ethanol was added thereto, and centrifugation was performed to precipitate the particles.

The supernatant was disposed of, and the resultant was allowed to be dispersed in a toluene solvent to obtain a toluene dispersion liquid containing core shell particles having In and P as cores and Zn and S as shells.

Comparative Example 1

<(1) Preparation of InP nanoparticles>

In the manner described below, InP nanoparticles serving as a Group III-V semiconductor were prepared using a solvethermal method.

First, 0.4 g of indium chloride ($InCl_3$), 3 mL of trioctylphosphine (TOP) serving as a surfactant, and 2.5 g of dodecylamine (DDA) were added to an autoclave in an argon gas atmosphere in a glove box. Further, 5 mL was added thereto as a solvent, and 0.5 mL of tris(dimethylamino)phosphine was added thereto.

The autoclave was transferred to an electric furnace, and the state was maintained at 75° C. for 1 hour, the autoclave was heated to 180° C., and the nanoparticles were allowed to grow for 24 hours.

10 mL of toluene and 6 mL of methanol were added to the nanoparticle dispersion liquid obtained using the above-described method, the resulting solution was sufficiently stirred, centrifugation was performed for 10 minutes, and the transparent supernatant was taken out after the centrifugation to separate a by-product generated due to the reaction with the InP nanoparticles.

The luminous efficacy at this time was approximately 1%, which was low.

<(2) Preparation of InP Nanoparticles Dispersed in Water>

The nanoparticles taken out in the step (1) were allowed to be dispersed in a mixed solution (the volume ratio of butanol to hexane was 1:2) of butanol and hexane. The concentration of the nanoparticles in the solution which was calculated using the extinction coefficient of the published document (Adam et al., Journal of Chemical Physics, Vol. 123, p. 084706 (2005)) based on the absorption spectrum was approximately $0.3\times10^{-5}$ mol particles/L. A small stirring bar was put into a glass bottle and placed on a hot stirrer, and the temperature of the heater was set to 70° C. At this time, the solution in the container was approximately 50° C.

2 mL of a mixed solution (ZT solution) containing zinc ions and thioglycolic acid as a surfactant was added to the nanoparticle dispersion liquid while being stirred. In this ZT solution, the concentration of the zinc ions was set to 0.13 mol/L, and the molar ratio between the zinc ions and the thioglycolic acid was set to 1:2.43.

Further, the pH value of the ZT solution was adjusted to 11.0 using sodium hydroxide.

By performing stirring, the nanoparticles of the organic layer were almost entirely distributed in a water layer, and the organic layer became transparent completely. Meanwhile, the water layer was turned into yellow or brown depending on the particle diameter of the nanoparticles. This aqueous solution was taken out using a pipette and transferred to a centrifuge tube. The supernatant solution was collected after centrifugation was performed in order to eliminate aggregated nanoparticles. The nanoparticles after being dispersed in water slightly emitted photoluminescence.

Further, the supernatant solution was poured into the centrifuge tube and methanol was poured thereinto as a poor solvent. As the result, the solution was suspended. Further, centrifugation was performed thereon to take out the powder of water-dispersible nanoparticles.

In addition, in a case where a surfactant was not present in the aqueous solution (ZT solution) during the step of dispersing the InP nanoparticles in the aqueous solution, the particles were easily dispersed in the aqueous solution and precipitation occurred. Further, in a case where zinc ions were not present in the aqueous solution, the nanoparticles were dissolved and disappeared due to the stirring of the solution, and both of the organic layer and the water layer became transparent.

<(3) Production of Semiconductor Nanoparticles having Core/Sell Structure>

The powder of water-dispersible nanoparticles obtained in the step (2) was dissolved in the ZT solution described in the step (2), and the solution was irradiated with ultraviolet light to prepare a zinc sulphide shell on the InP nanoparticle by referring to the method in the published document (Murase et al., Colloids & Surfaces A, Vol. 294, p. 33 (2007)), thereby obtaining a dispersion liquid containing the core shell particles.

Comparative Example 6

<Preparation of Indium Precursor Solution>

4.0 mmol of indium acetate, 12 mmol of oleic acid, and 1.2 mL of 1-octadecene were put into a 100 mL reactor, and the reaction was carried out at approximately 120° C. for approximately 1 hour. Thereafter, 35 mL of 1-octadecene was added to the reactor. The indium oleic acid ($In(OA)_3$) solution as a resultant was stored at room temperature in a nitrogen atmosphere.

<Preparation of Zinc Precursor Solution>

4.0 mmol of indium acetate, 8.0 mmol of oleic acid, and 2.4 mL of 1-octadecene were put into a 100 mL reactor, and the reaction was carried out at approximately 120° C. for approximately 1 hour. Thereafter, 35 mL of 1-octadecene was added to the reactor. The zinc oleic acid ($Zn(OA)_2$) solution as a resultant was stored at room temperature in a nitrogen atmosphere.

<Preparation of Sulfur Precursor Solution>

4.0 mmol of sulfur and 4.0 mmol of trioctylphosphine were put into a 50 mL reactor, and the solution was stirred at a temperature of approximately 150° C. until the sulfur was completely dissolved in a nitrogen atmosphere. The resultant was cooled to room temperature, and 1-octadecene was injected to the solution such that the concentration of trioctylphosphine sulphide was set to 1 mmol/mL. The trioctylphosphine sulphide solution as a resultant was stored at room temperature in a nitrogen atmosphere.

<Production of Core Shell Particles>

1.0 mmol (solution) of indium oleic acid ($In(OA)_3$), 3.0 mmol (solution) of zinc oleic acid ($Zn(OA)_2$), and 1-octadecene were injected into a reactor. The reactor was allowed to stand at a temperature of approximately 120° C. for approximately 1 hour in a nitrogen atmosphere to remove moisture and oxygen. Thereafter, the inside of the reactor was substituted with nitrogen, and the reactor was heated until the temperature of the reactor reached approximately 300° C. while the nitrogen atmosphere was maintained.

Next, the 1-octadecene was mixed with 3.0 mmol (solution) of trioctylphosphine sulphide (TOPS), tris(trimethylsilyl)phosphine (TMS3P) (10 wt % hexane solution) was mixed with the solution in a glove box.

A mixture of a trioctylphosphine sulphide solution and a trimethylsilylphosphine solution was rapidly injected thereto using an injector while the temperature of the reactor was maintained to approximately 300° C. Next, a mixture of a sulfur precursor solution and a phosphorus precursor solution was injected thereto, and the reaction was carried out while the temperature of the reactor was maintained at approximately 300° C. for 40 minutes.

After the reaction for forming the core and the shell was finished, the reactor was cooled to room temperature under a condition of a nitrogen atmosphere.

detection light using a parabolic mirror. The sample solution was filled with a quartz cell (optical path length of 1 mm). The Raman detection light transmitted through the sample was wavelength-dispersed by a spectroscope and detected by a charge-coupled device (CCD).

After spectral information of a Raman signal was obtained in the above-described manner, the peak height of a peak at 350 $cm^{-1}$ (peak derived from an In—P bond) was measured. Further, at the time of normalization of the peak height to 1, the peak height of a peak at 210 $cm^{-1}$ (peak derived from an In—Zn bond) was measured as the “Raman peak intensity ratio”.

[Luminous Efficacy]

The emission intensity was measured by adjusting the concentration of the obtained dispersion liquid containing the core shell particles such that the absorbance at an excitation wavelength of 450 nm was set to 0.02 using an absolute PL quantum yield measuring device C9920-02 (manufactured by Hamamatsu Photonics K. K.).

Further, the luminous efficacy in Table 1 was calculated as a ratio of the number of emission photons to the number of absorption photons.

TABLE 1

| | Example | | | | | | Comparative Example | | | | | |
|---|---|---|---|---|---|---|---|---|---|---|---|---|
| | 1 | 2 | 3 | 4 | 5 | 6 | 1 | 2 | 3 | 4 | 5 | 6 |
| Mixing ratio of Zn/In | 2 | 2 | 2 | 2 | 1.5 | 3 | 0 | 1 | 1 | 1 | 2 | 3 |
| Temperature (° C.) at the time of adding Group V raw material | 180 | 180 | 180 | 180 | 180 | 180 | — | 180 | 180 | 180 | 180 | — |
| Temperature (° C.) of forming core | 220 | 220 | 220 | 220 | 220 | 220 | — | 220 | 220 | 220 | 220 | — |
| Temperature (° C.) of forming shell | 255 | 270 | 285 | 295 | 255 | 255 | — | 240 | 255 | 270 | 240 | — |
| Raman peak intensity ratio | 0.18 | 0.25 | 0.28 | 0.33 | 0.16 | 0.19 | 0 | 0.05 | 0.09 | 0.11 | 0.06 | 3.01 |
| Luminous efficacy (%) | 55 | 58 | 59 | 56 | 48 | 56 | 10 | 34 | 36 | 38 | 33 | 10 |

Thereafter, an excessive amount of acetone and ethanol was added to the resultant after the proportion between acetone and ethanol was set to approximately 10:1, and the resultant was separated using a centrifugal separator at 4000 rpm to precipitate the core shell particles.

After the transparent solution was removed from the precipitate, toluene was added to the precipitate, and the precipitate was re-dispersed in the solvent.

The process of centrifugation and the re-dispersion was repeated, thereby obtaining a toluene dispersion liquid containing the core shell particles.

[Raman Peak Intensity Ratio]

The Raman peak intensity ratio was measured according to the following method using the obtained dispersion liquid containing the core shell particles as a sample. As a light source, a titanium sapphire laser (Libra, manufactured by Coherent Japan, Inc., wavelength of 800 nm, pulse time width of 92 fs, output of 4.10 W, and repetition frequency of 1 kHz) was used. The fundamental wave (800 nm) was divided into two waves so as to be used to generate Raman excitation light and white light for Raman detection. The Raman excitation light (530 nm, 3.5 ps, 8 $cm^{-1}$) was generated using a picosecond optical parametric amplifier, and the Raman detection light was generated by focusing the fundamental wave on a sapphire plate. In a case of the Raman detection light, the wavelength range thereof was selected to be in a range of 532 to 680 nm, dispersion compensation was carried out using a chirp mirror, and the pulse time width thereof was set to 10 fs. The sample was irradiated with the Raman excitation light and the Raman In Table 1, “0” in the column of the “mixing ratio of Zn/In” of Comparative Example 1 indicates that the In raw material and the Zn raw material were not mixed. Further, “–” in the columns of the “temperature (° C.) at the time of adding Group V raw material”, the “temperature (° C.) of forming core”, and the “temperature (° C.) for forming shell” indicates that the method of producing the core shell particle did not correspond to the production method according to the embodiment of the present invention.

[Description of Results]

Based on the results listed in Table 1, the Raman peak intensity ratio was set to be in a range of 0.16 to 0.33 by setting the mixing ratio of Zn and In to 1.5 or greater in the first step during the production of the core shell particle and setting the temperature of forming the shell in the third step to 255° C. to 295° C.

It was clear that the luminous efficacy of Examples 1 to 4 in which the Raman peak intensity ratio was in a range of 0.16 to 0.33 was excellent compared to the luminous efficacy of Comparative Examples 1 to 6 in which the Raman peak intensity ratio was out of the above-described range.

As shown in Comparative Examples 1 to 5, the luminous efficacy deteriorated in a case where the Raman peak intensity ratio was less than 0.16. The reason for this is considered that lattice mismatch between the core and the shell was not alleviated because the thickness of the In—Zn—P alloy layer formed between the core and the shell was not sufficient, and thus the luminous efficacy was degraded.

Further, as shown in Comparative Example 6, it was found that the luminous efficacy was degraded even in a case where the Raman peak intensity ratio was greater than 0.33. The reason for this is considered that the alloying excessively proceeded and the thickness of the In—Zn—P alloy layer between the core and the shell was extremely large. Further, it became apparent that an optimal alloy thickness is present in order to improve the luminous efficacy.

As described above, it is speculated that the thickness of the In—Zn—P alloy layer formed between the core and the shell is appropriate so that the lattice mismatch between the core and the shell is sufficiently alleviated in a case where the Raman peak intensity ratio is in a range of 0.16 to 0.33, and thus the luminous efficacy is improved.

What is claimed is:

1. A core shell particle comprising:

a core which contains a Group III element and a Group V element; and a shell which covers at least a part of a surface of the core and contains a Group II element and a Group VI element, wherein a ratio of a peak intensity showing a bond between the Group III element and the Group II element to a peak intensity showing a bond between the Group III element and the Group V element, which is measured by Raman spectroscopy, is in a range of 0.16 to 0.33.

2. The core shell particle according to claim 1, wherein the Group III element is In, and the Group V element is any of P, N, or As.

3. The core shell particle according to claim 2, wherein the Group III element is In, the Group V element is P, the Group II element is Zn, the Group VI element is S, and a peak showing a bond between the Group III element and the Group V element is present in a range of 340 to 365 $cm^{-1}$, and a peak showing a bond between the Group III element and the Group II element, which is measured by Raman spectroscopy, is present in a range of 200 to 230 $cm^{-1}$.

4. The core shell particle according to claim 2, wherein the Group III element is In, and the Group V element is P.

5. The core shell particle according to claim 4, wherein the Group III element is In, the Group V element is P, the Group II element is Zn, the Group VI element is S, and a peak showing a bond between the Group III element and the Group V element is present in a range of 340 to 365 $cm^{-1}$, and a peak showing a bond between the Group III element and the Group II element, which is measured by Raman spectroscopy, is present in a range of 200 to 230 $cm^{-1}$.

6. The core shell particle according to claim 1, wherein the Group II element is Zn, and the Group VI element is S or Se.

7. The core shell particle according to claim 6, wherein the Group III element is In, the Group V element is P, the Group II element is Zn, the Group VI element is S, and a peak showing a bond between the Group III element and the Group V element is present in a range of 340 to 365 $cm^{-1}$, and a peak showing a bond between the Group III element and the Group II element, which is measured by Raman spectroscopy, is present in a range of 200 to 230 $cm^{-1}$.

8. The core shell particle according to claim 6, wherein the Group II element is Zn, and the Group VI element is S.

9. The core shell particle according to claim 8, wherein the Group III element is In, the Group V element is P, the Group II element is Zn, the Group VI element is S, and a peak showing a bond between the Group III element and the Group V element is present in a range of 340 to 365 $cm^{-1}$, and a peak showing a bond between the Group III element and the Group II element, which is measured by Raman spectroscopy, is present in a range of 200 to 230 $cm^{-1}$.

10. The core shell particle according to claim 1, wherein the Group III element is In, the Group V element is P, the Group II element is Zn, the Group VI element is S, and a peak showing a bond between the Group III element and the Group V element is present in a range of 340 to 365 $cm^{-1}$, and a peak showing a bond between the Group III element and the Group II element, which is measured by Raman spectroscopy, is present in a range of 200 to 230 $cm^{-1}$.

11. A film comprising:

the core shell particle according to claim 1.

* * * * *